United States Patent [19]

Ali

[11] Patent Number: 5,709,184
[45] Date of Patent: Jan. 20, 1998

[54] PISTON PIN AND ROD BUSHING FOR NON-ROUND PISTON

[75] Inventor: Amjad Ali, Troy, Mich.

[73] Assignee: General Motors Corporation, Detroit, Mich.

[21] Appl. No.: 785,143

[22] Filed: Jan. 13, 1997

[51] Int. Cl.$^6$ ........................................ F01P 1/04
[52] U.S. Cl. ........................................ 123/193.6; 92/187
[58] Field of Search ........................ 123/193.6; 92/187, 92/233, 238

[56] References Cited

U.S. PATENT DOCUMENTS

| | | | |
|---|---|---|---|
| 3,173,344 | 3/1965 | Mongitore | 92/187 |
| 3,191,264 | 6/1965 | Underwood et al. | 92/187 |
| 4,342,291 | 8/1982 | Lewis | 123/193.6 |
| 4,796,517 | 1/1989 | Akao et al. | 123/193.6 |
| 4,858,566 | 8/1989 | Paul et al. | 123/193.6 |
| 4,864,986 | 9/1989 | Bethel et al. | 123/193.6 |

*Primary Examiner*—Marguerite McMahon
*Attorney, Agent, or Firm*—Karl F. Barr, Jr.

[57] ABSTRACT

A piston assembly for an internal combustion engine includes a piston having a pair of opposed piston pin bosses. The bosses include first and second coaxial bores which define a piston pin bore. A connecting rod, having an end including a through-bore, extends into the piston and is connected to the piston by a piston pin assembly. The assembly includes a first journal end for disposition within the first coaxial bore, a second journal end disposed within the second coaxial bore and a spherical journal portion disposed intermediate of the first and said second ends. A bushing is assembled about the spherical journal portion and has a spherical inner surface corresponding to the spherical journal portion and an outer surface corresponding to and disposed in the connecting rod through-bore. The spherical journal portion rotates relative to the spherical inner surface of the bushing so as to facilitate rotational alignment of the piston in an engine cylinder bore.

3 Claims, 3 Drawing Sheets

1

PISTON PIN AND ROD BUSHING FOR NON-ROUND PISTON

TECHNICAL FIELD

The invention relates to pistons for internal combustion engines and, more particularly, to an apparatus for optimizing alignment of a non-round piston in a cylinder bore.

BACKGROUND OF THE INVENTION

Automotive internal combustion engines may utilize cylindrical pistons which are mounted for reciprocal movement in corresponding cylinders. The mounting of a cylinder in an engine involves the use of a connecting rod having a lower end journaled to a rotatable crankshaft and an upper end similarly attached to a piston pin extending in a diametrical through-bore in the piston. The piston pin in a typical piston is supported at its ends in the piston through-bore such that the pin acts as a journal with the through-bore functioning as a supporting bearing. The upper end of the connecting rod includes a bushing for engagement with the piston pin, intermediate of its piston-supported ends, thus completing the connection of the piston with the rotatable crankshaft.

The orientation of the above described piston in the engine cylinder is defined by multiple, parallel axes. The crankshaft axis, the crank journal axis, the piston through-bore axis, the piston pin axis and the connecting rod bushing axis each affect the final, mounted orientation of the piston. Angular variation of one or more of the axes, relative to the others, is accounted for by rotation of the piston in the cylinder during assembly of the engine.

Non-round pistons and bores are known which utilize a piston and bore cross section having an elliptical or race track cross section. In such engines, alignment of the various piston mounting axes, described above, is critical for proper orientation of the piston in the cylinder. Should the alignment of the piston in the cylinder vary angularly relative to the crankshaft axis or other parallel axes, self alignment of the piston within the bore is not possible due to the non-round cross-section of the piston and cylinder, resulting in interference and friction therebetween. Substantial difficulty has been recognized in the manufacture of non-round pistoned engines having acceptable alignment of the axes which are parallel to the crankshaft.

SUMMARY OF THE INVENTION

The present invention is directed to an internal combustion engine having a non-round piston mounted for reciprocation within a similarly configured engine cylinder. The piston is supported, relative to a rotatable crankshaft, by a connecting rod having a lower end journaled to a crankshaft throw and an upper end connected to a piston pin supported within the piston. Due to the non-round cross-section of the piston and corresponding cylinder, major and minor axes are defined with the piston pin axis preferably located substantially parallel to one of these axes.

The piston pin includes first and second ends which are journaled within a corresponding through-bore in the piston. A spherical connecting rod journal is defined intermediate of the first and second ends of the piston pin and is supported in a connecting rod bushing having a similar, spherical supporting surface. The spherical journal and bushing cooperate to allow angular movement of the piston from the crankshaft axis. Such movement is desirable to allow alignment of the piston with the engine cylinder in cases of angular misalignment of the piston pin axis with the crankshaft, and other parallel axes.

Another feature of the present invention may be the use of a uniquely configured piston pin and connecting rod bushing which eases assembly of the piston with the connecting rod. The first and second ends of the piston pin may be configured with different diameters such that the second end has a diameter which is the same as, or slightly larger than that of the outer diameter of the spherical journal and bushing. Assembly of the piston pin into the piston and connecting rod end is facilitated through a piston through-bore having a first end configured to support the first end of the pin and a large diameter second end to support the second end of the pin. Insertion of the piston pin into the piston and connecting rod end is through the second end of the piston through bore. Due to the large diameter of the second end of the piston through bore, the spherical journal may be installed with its corresponding spherical bushing assembled thereto.

These and other features, objects and advantages of the invention will be more apparent from the following detailed description and the drawings.

DESCRIPTION OF THE PREFERRED EMBODIMENT

Figure 1:
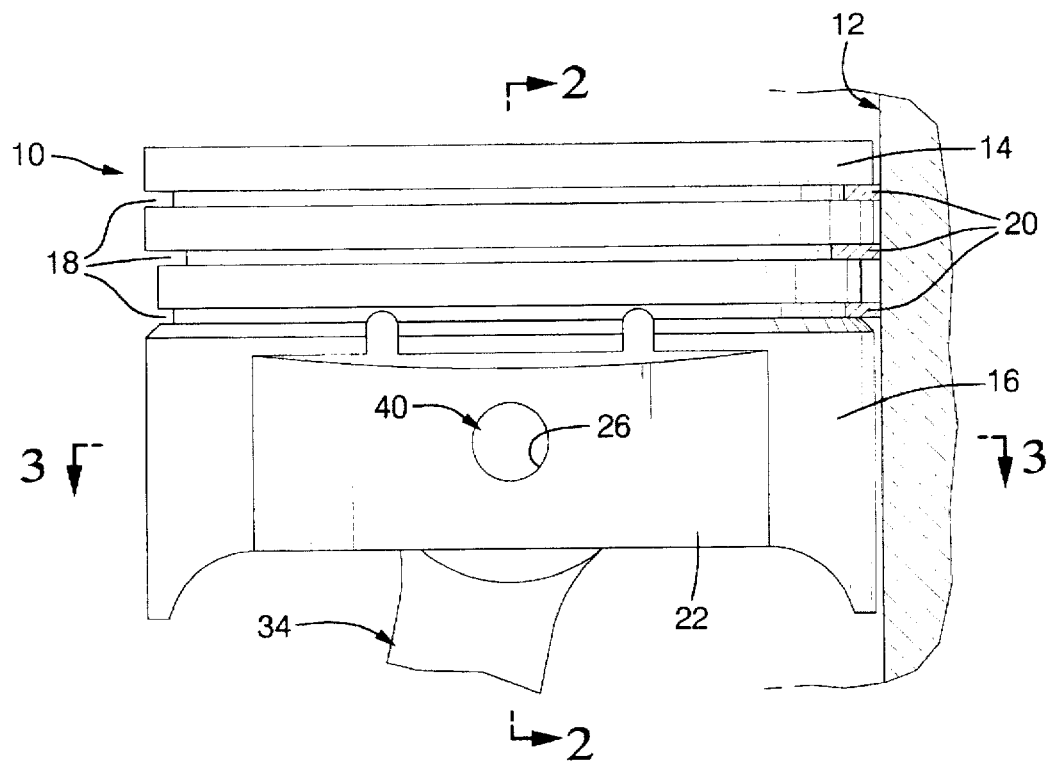
FIG. 1 is a partial, side view of a piston and engine cylinder embodying features of the present invention.
Figure 2:
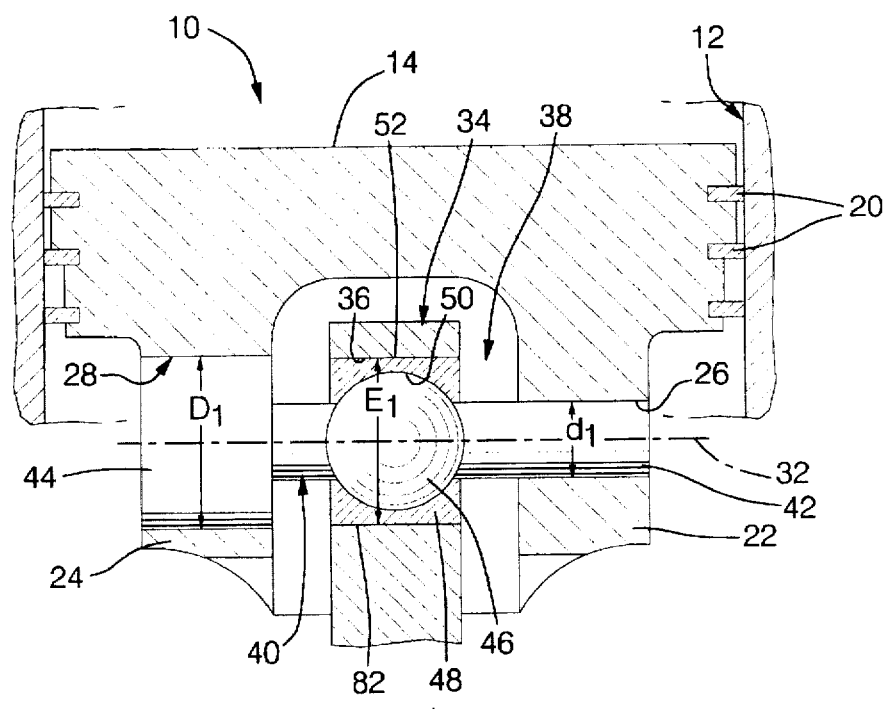
FIG. 2 is a sectional view of the piston of FIG. 1, taken along line 2—2 of FIG. 1.
Figure 3:
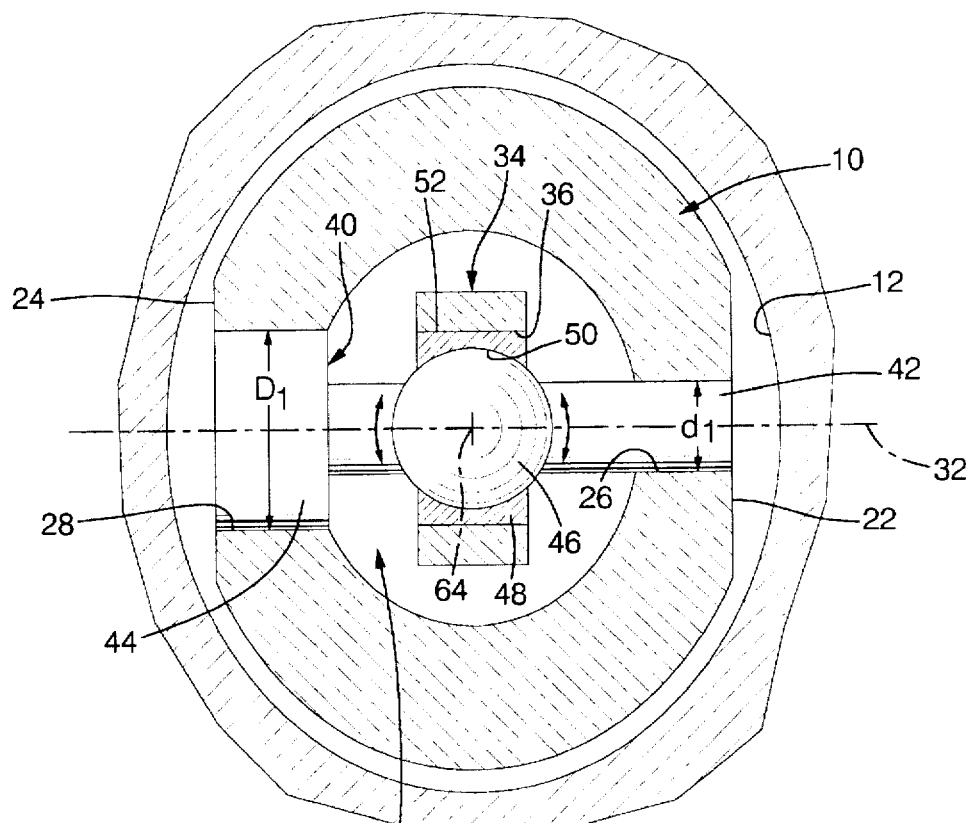
FIG. 3 is a sectional view of the piston of FIG. 1, taken along line 3—3 of FIG. 1.

In FIG. 1 there is illustrated a piston, referred to generally as 10, for operation in the cylinder bore 12 of an internal combustion engine. The piston 10 includes a crown 14 cast integrally with a depending outer surface including a piston skirt 16. A plurality of ring grooves 18 are machined about the perimeter of the crown 14, in a conventional manner, and are configured to receive a series of piston rings 20 therein. A pair of diametrically opposed piston pin bosses 22 and 24 depend from the crown 14 and are typically cast integrally with the crown and the depending piston skirt 16. Each of the bosses 22 and 24 are provided with coaxially aligned pin bores 26 and 28 respectively, to define transversely extending piston pin bore 30 having an axis 32. As illustrated in FIGS. 2 and 3, pin bore 26 has a first diameter $d_1$ while pin bore 28 is configured with a larger diameter $D_1$. A connecting rod 34, the piston end of which is shown, includes a journal opening 36 for accepting a piston pin and bushing assembly 38 in a rotatable, supporting relationship therewith.

The piston pin and bushing assembly 38 includes an axially extending piston pin 40 having a first, journal end 42, a second, journal end 44 and a spherical journal portion 46 located intermediate of the first and second ends 42 and 44, respectively. Installed about the spherical journal portion 46 is a bushing assembly 48 having a two piece, clam-shell configuration for ease of installation about the journal. The bushing assembly 48 defines an inner bearing surface 50 having a spherical configuration which mirrors that of the spherical journal portion 46 of the piston pin 40. The exterior surface 52 of the bushing assembly 48 is cylindrically configured for installation into the corresponding journal opening 36 in the upper, piston end of the connecting rod 34. Once installed in opening 36, the piston pin 40 is supported by the bushing assembly 48, relative to the connecting rod 34.

Figure 5:
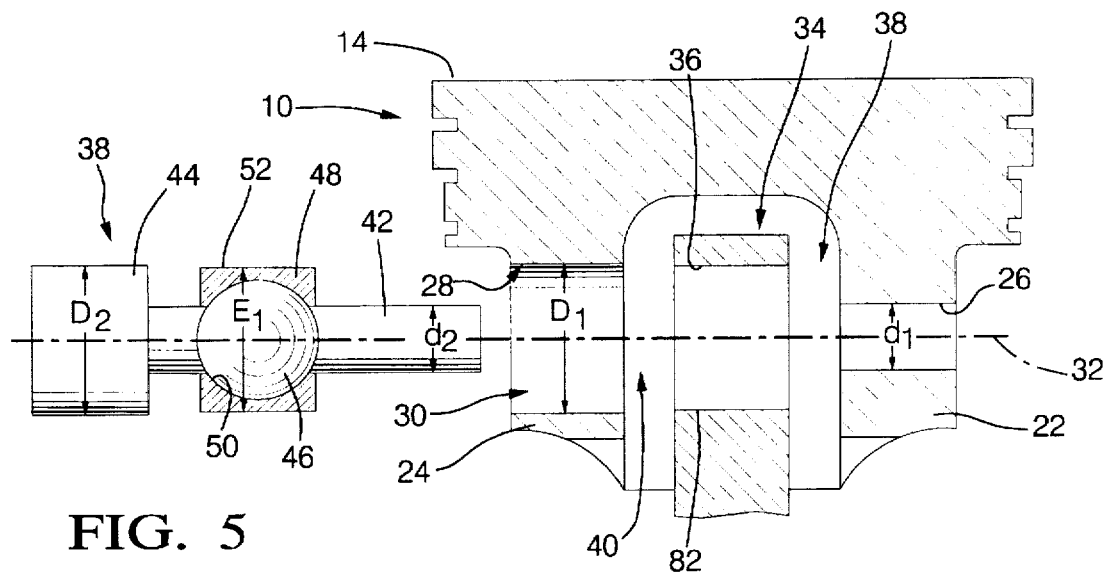
FIGS. 5, 6 and 7 are sectional views of the piston of FIG. 1, sequentially illustrating the installation of the piston pin and connecting rod bushing.
Figure 6:
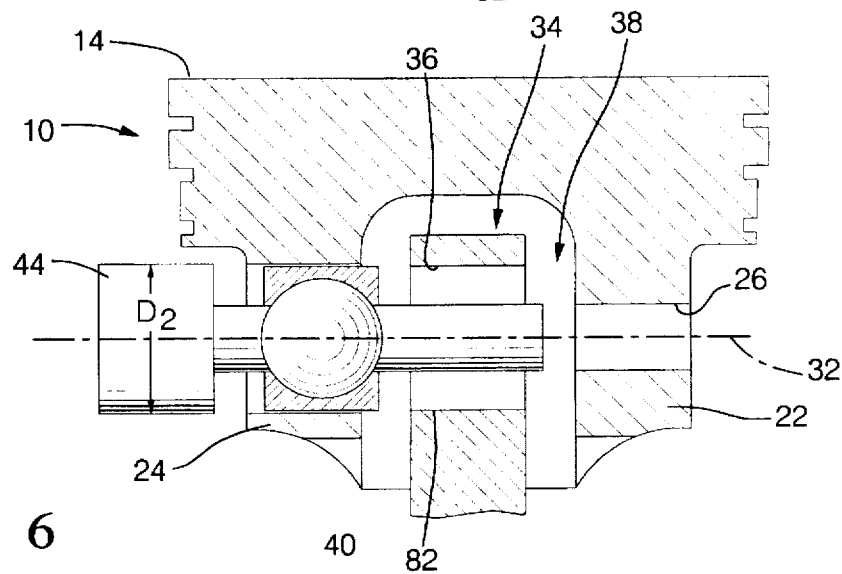
Figure 7:
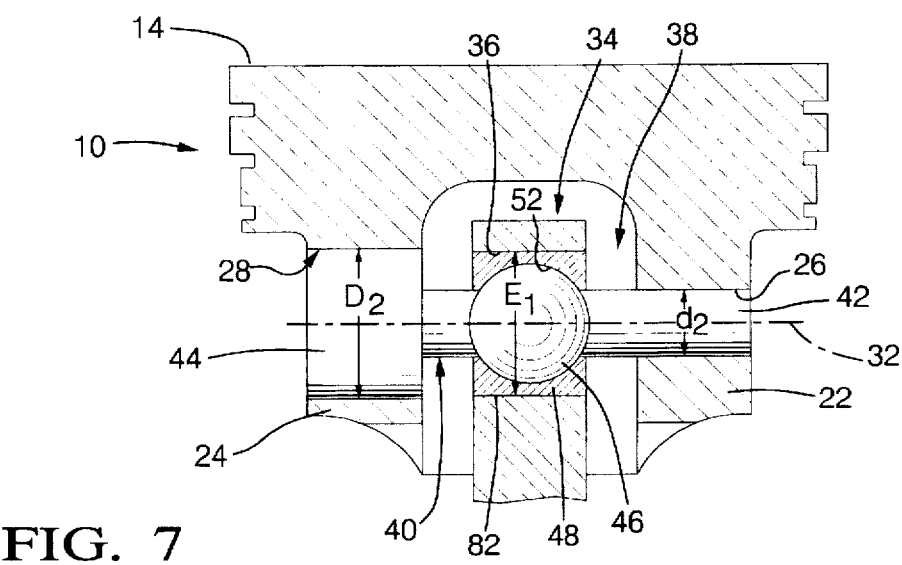

Referring to FIGS. 5–7, the first end 42 of the piston pin 40 has a diameter $d_2$ which is substantially the same as that of the piston pin bore 26 and is journaled within the bore for support. Similarly, the second end 44 of the piston pin 40 has a diameter $D_2$ which is substantially similar to that of the piston pin bore 28 and is similarly received in that bore for support. To facilitate assembly of the piston 10 to the connecting rod 34, the diameter $D_2$ of the second end 44 of the piston pin 40 is preferably sized to be larger than the exterior diameter $E_1$ of the bushing assembly 48.

To assemble the connecting rod 34 to the piston 10, the upper end of the rod 34 is positioned within the piston, as illustrated in FIG. 5, such that the journal opening 36 is aligned with the axis 32 of the piston pin bore 30. The first end 42 of the piston pin and bushing assembly 38 is inserted axially into the piston pin bore 30 through the large diameter pin bore 28, FIG. 6. Upon full insertion of the piston pin and bushing assembly 38 into the piston pin bore 30 of the piston 10, FIG. 7, the first end 42 of the piston pin 40 is journaled in the pin bore 26, the second end 44 of the piston pin 40 is journaled in the larger diameter pin bore 28 and the outer surface 52 of the split bushing 48 is journaled in the connecting rod through-bore 36, effectively joining the connecting rod 34 with the piston 10 and thus the piston 10 to the rotatable crankshaft of the engine.

Figure 4:
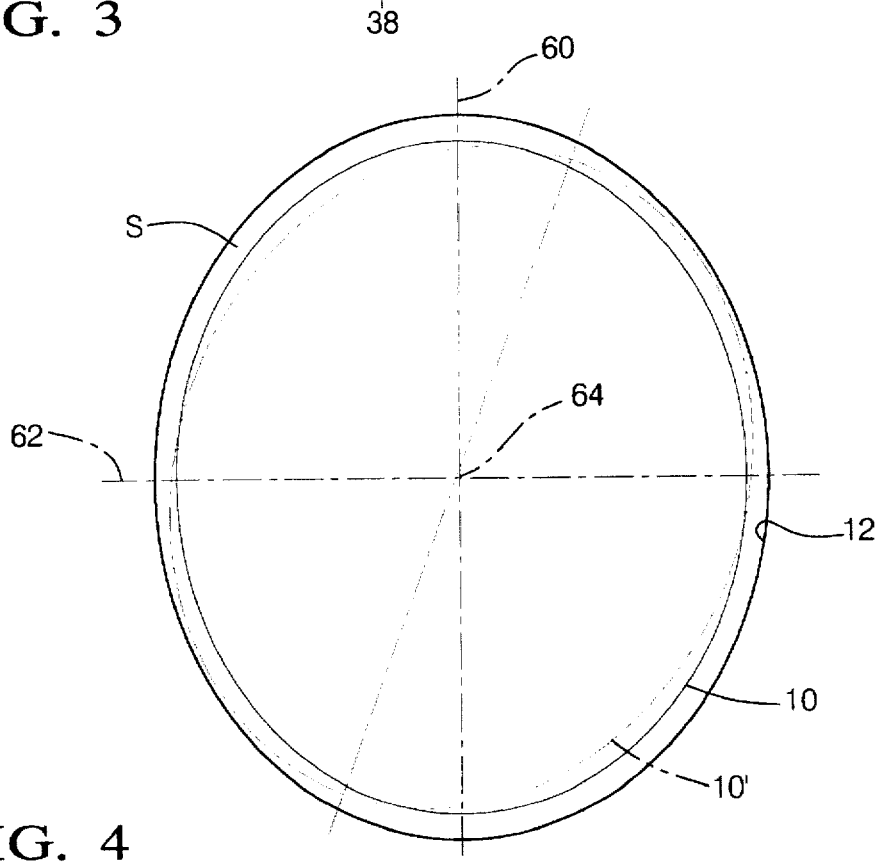
FIG. 4 is a top view of the piston and cylinder of FIG. 1 which includes a representation of a misaligned piston shown in phantom.

Referring now to FIGS. 3 and 4, the fully assembled piston and connecting rod assembly includes the piston 10, connecting rod 34, piston pin 40 and spherical bushing 48. Installation of the assembled piston and connecting rod is facilitated through the use of the piston pin and bushing assembly 38 of the present invention in that proper orientation of the piston 10 within the cylinder bore 12 is assured. For purposes of example, FIG. 4 schematically illustrates an engine cylinder 12 which defines major and minor axes 60 and 62, respectively. When installed in the cylinder 12 a properly oriented piston 10 shares identical major and minor axes with the cylinder so as to establish a consistent piston-to-cylinder wall spacing 'S' to minimize friction and wear during engine operation. As shown in phantom in FIG. 4, the piston 10' may, in actuality be subject to misalignment due to manufacturing tolerance stack-up between the parallel axes of the crankshaft, the crankshaft journal, the connecting rod, the piston pin and the piston bore. The spherical journal 46 of the piston pin 40 is free to rotate within the spherical bushing 48, FIG. 3, thereby correcting the misalignment of the piston 10 within the bore 12 by facilitating rotation of the piston 10 about the connecting rod longitudinal axis 64, allowing the major and the minor axes 60 and 62 of the cylinder to align with similar axes of the piston 10 so as to center the piston within the cylinder bore.

The piston configuration disclosed herein provides a solution to misalignment of non-round pistons in similarly configured engine cylinders of internal combustion engines by providing a spherical journal connection between the piston pin and the connecting rod which allows rotation of the piston and piston pin assembly relative to the longitudinal axis of the connecting rod. Such rotation of the piston relative to the connecting rod allows the piston to rotate within the cylinder bore to establish proper orientation of the piston regardless of misalignment caused by manufacturing tolerance stack-up between the various parallel axes of the engine which typically control piston alignment within the engine cylinder and which adversely affect the operation of non-round pistons in non-round cylinders.

Additionally, the preferred embodiment illustrated herein is directed to a piston and piston pin configuration which is easily assembled through the use of a split spherical bushing assembly which can be end-loaded into the piston and connecting rod bores. An oversized piston pin end which is slideably received within a corresponding pin bore allows through-passage of the piston pin and bushing assembly, during assembly of the connecting rod to the piston.

Although the preferred embodiment of the invention disclosed herein is described with respect to a spherical journal piston pin, it is contemplated that other journal configurations, which facilitate movement and self alignment of the piston within the engine cylinder, are contemplated.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiment may be modified in light of the above teachings. The embodiment described was chosen to provide an illustration of the principles of the invention and of its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

I claim:

1. A piston assembly for an internal combustion engine comprising a piston having a pair of opposed piston pin bosses including first and second coaxial bores extending therethrough to define a piston pin bore having an axis, a connecting rod having an end including a journal opening, and a piston pin assembly comprising a first journal end disposed within said first coaxial bore and, a second journal end disposed within said second coaxial bore and a spherical journal portion disposed intermediate of said first and said second ends and having a bushing assembled thereabout, said bushing having a spherical inner surface corresponding to said spherical journal portion and an outer surface corresponding to and disposed in said connecting rod journal opening, said spherical journal portion operable to rotate relative to said spherical inner surface of said bushing so as to facilitate rotation of said piston in an engine cylinder bore.

2. A piston assembly for an internal combustion engine, as defined in claim 1, said connecting rod defining a longitudinal axis about which said spherical journal portion rotates in said spherical inner surface of said bushing so as to facilitate rotation of said piston about said longitudinal axis in said engine cylinder bore.

3. A piston assembly for an internal combustion engine, as defined in claim 1, said outer surface of said bushing having a dimension less than said second end of said piston pin and said second coaxial bore wherein insertion of said piston pin and said bushing is facilitated through said coaxial bore.

\* \* \* \* \*